(12) United States Patent
DaSilva

(10) Patent No.: US 6,312,203 B1
(45) Date of Patent: Nov. 6, 2001

(54) TAMPER-EVIDENT FASTENING DEVICE

(76) Inventor: Carlos H. DaSilva, 504 Winamac Ct., Midlothian, VA (US) 23113

( * ) Notice: Subject to any disclaimer, the term of this patent is extended or adjusted under 35 U.S.C. 154(b) by 0 days.

(21) Appl. No.: 09/595,846

(22) Filed: Jun. 16, 2000

(51) Int. Cl.[7] .............................. F16B 19/00; F16B 33/00
(52) U.S. Cl. ...................... 411/372.5; 411/377; 411/909; 411/910
(58) Field of Search .............................. 411/372.5, 372.6, 411/373, 377, 909, 910

(56) References Cited

U.S. PATENT DOCUMENTS

| | | | |
|---|---|---|---|
| 3,513,429 | * | 5/1970 | Helsop ............................. 411/909 X |
| 4,022,519 | * | 5/1977 | Hill .................................. 411/909 X |
| 4,320,693 | * | 3/1982 | Benjamin ........................ 411/909 X |
| 5,059,076 | * | 10/1991 | Kondo ............................. 411/909 X |

OTHER PUBLICATIONS

Website: "http://www.acsystemguard.com", "SystemGuard is a New Product Taking the Air Conditioning Industry by Strom", p. 1, copyright 2000.
Website: "http://ww.acsystemguard.com/whatisit.html", "What is it?", pp. 1–2, copyright 2000.
Website: "http://www.acsystemguard.com/sysnews.html", "News", p. 1, copyright 2000.
Website: "http://www.acsystemguard.com/sysnews–motor-magazine.html", "News—Motor—Top 20 Tools" pp. 1–2, copyright 2000.
Website: "http://www.acsystemguard.com/findadistributor.html", "Find a Distributor", pp. 1–10, copyright 2000.
Website: "http://www.acsystemguard.com/succeed.html", "We've Succeeded", p. 1, copyright 2000.
Website: "http://www.acsystemguard.com/faq.html", "Faq", pp. 1–2, copyright 2000.
Website: "http://www.acsystemguard.com/contactus.html", "Contact Us", p. 1, copyright 2000.

* cited by examiner

Primary Examiner—Neill Wilson
(74) Attorney, Agent, or Firm—Hunton & Williams

(57) ABSTRACT

The invention is a tamper-evident fastener comprising a fastener-thermomshrinkable sleeve assembly and method of using the assembly. The device includes a thermoshrinkable sleeve that fits over a fastener having a shaft and head. Upon placing the fastener and sleeve in a position of use and heating the thermoshrinkable sleeve, the sleeve shrinks to substantially conform to the configuration of the fastener head it surrounds and provides a protective sheath that must be dislodged or removed to alter the position of the fastener. The sleeve may additionally function as a washer between the fastener and the object receiving the fastener. One example of use of this device is as a motor oil drain plug.

12 Claims, 2 Drawing Sheets

TAMPER-EVIDENT FASTENING DEVICE

BACKGROUND OF THE INVENTION

1. Field of Invention

The present invention relates broadly to tamper-evident fastening devices. More particularly the invention relates to a threaded fastener such as a screw or drain plug with a tamper-evident sheath formed from a thermoshrinkable sleeve.

2. Background of Invention

Many mechanical devices contain screw-type plugs in critical functions. One such example is the oil drain plug of motors. Lube and oil change businesses incur considerable expense every year replacing or repairing motors in vehicles where a loose oil plug has led to loss of oil and failure of the motor. The loose state of the oil plug may be the result of deliberate tampering or improper maintenance by service personnel.

Given the importance of the function of these types of fasteners, it is highly desirable to have a convenient device and/or method for detecting removal or tampering. Additionally, it is desirable to have an efficient means to monitor servicing of these devices that would verify proper maintenance and installation for the purpose of quality control.

Currently, a method in common use is spraying across the device with spray paint. This method suffers the disadvantages of being easy to circumvent by one intent on deceit. This method also results in disfiguration of the equipment with splotches of spray paint and can cause confusion after multiple servicing events in which multiple layers of paint have been applied.

Thus, there is a need for a tamper-evident fastening device that can be used as a motor oil drain plug to monitor proper installation and unauthorized manipulation of such plugs.

SUMMARY OF INVENTION

It is therefore an objective of the present invention to provide a simple, economical tamper-evident fastener.

It is another objective of the present invention to provide a tamper-evident fastener that is usable as a drain plug.

It is a further objective of the present invention to provide a method of use for a tamper-evident fastener.

Toward these ends, a tamper-evident fastener for insertion into a passage formed in an object according to the present invention comprises an elongated fastener shaft having a proximal end and a distal end and a fastener head attached to the proximal end of the shaft. The fastener head has opposed distal and proximal surfaces and is configured for manipulation of the fastener for installation and removal. The tamper-evident fastener also comprises an elastomeric sleeve formed around at least a portion of the fastener head. The elastomeric sleeve is formed from a thermoshrinkable material and is configured so that upon application of sufficient heat the elastomeric sleeve will shrink to establish a tamper-evident appearance and conform to at least a portion of the fastener head. This secures the elastomeric housing to the fastener and assures that substantial subsequent manipulation of the fastener for removal of the fastener causes a visually apparent change in the tamper-evident appearance of the elastomeric sleeve.

The elastomeric sleeve of a tamper-evident fastener according to the present invention may be formed as a cylindrical tube having a central passage with a diameter sufficient to accommodate at least partial insertion of the fastener head into the central passage. At least a portion of the elastomeric sleeve may be formed adjacent the distal surface of the fastener head to provide an intermediate layer between the fastener head and a surface surrounding the passage when the fastener shaft is inserted into the passage of the object. At least a portion of the fastener shaft of a tamper-evident fastener of this invention may be threaded for mating with a threaded portion of the passage. The fastener may be configured to prevent a fluid from migrating through the passage. Optionally, when the passage is a through hole at least a portion of the shaft may be threaded for mating engagement with a threaded female coupling.

The elastomeric sleeve of the tamper-evident fastener of this invention may be formed and configured so that after thermal shrinkage the sleeve will remain secured to the fastener upon subsequent exposure to temperatures up to at least about 250° F. The elastomeric sleeve may be formed so that after thermal shrinkage the sleeve may remain secured to the fastener upon subsequent contact with a petroleum product.

Another embodiment of the present invention is a tamper-evident sleeve for application to a fastener having a fastener shaft and a fastener head with opposed distal and proximal surfaces wherein the fastener head is attached to one end of a fastener shaft. The sleeve comprises an elastomeric housing defining a central cavity and at least one opening into the central cavity. The central cavity and the opening. are configured to accommodate at least partial insertion of the fastener head into the central cavity. The elastomeric housing is formed from a thermoshrinkable material and is configured so that upon application of sufficient heat, the housing will shrink to establish a tamper-evident appearance and conform to at least a portion of the fastener head. This secures the elastomeric housing to the fastener and assures that substantial subsequent manipulation of the fastener will cause a visually apparent change in the tamper-evident appearance of the elastomeric housing.

The elastomeric housing of the tamper-evident sleeve of this invention further may be formed as a cylindrical tube. At least a portion of the elastomeric housing of the tamper-evident sleeve of this invention may be formed adjacent the distal surface of the fastener head to provide an intermediate layer between the fastener head and a surface of an object forming a passage into which the fastener is inserted.

The elastomeric housing may be formed and configured so that after thermal shrinkage it will remain secured to the fastener upon subsequent exposure to temperatures Up to at least about 250° F. Additionally, the elastomeric housing may be formed and configured so that after thermal shrinkage it will remain secured to the fastener upon subsequent contact with a petroleum product.

A method of installing a tamper-evident fastener into a passage formed in an object according to the present invention comprises providing a fastener having an elongated fastener shaft with a proximal end and a distal end, and a fastener head attached to the proximal end of the fastener shaft. The fastener head has opposed distal and proximal surfaces and is configured for manipulation of the fastener for installation and removal. The method of installing a tamper-evident fastener of this invention further comprises the step of providing an elastomeric sleeve formed around at least a first portion of the fastener head. The sleeve has an elastomeric housing defining a central cavity and at least one opening into the central cavity. The elastomeric housing of the sleeve is formed from a thermoshrinkable material and configured and disposed around the at least a first portion of the fastener head. Upon application of sufficient heat, the elastomeric housing shrinks to establish a tamper-evident appearance and conform to at least a second portion of the fastener head to secure the elastomeric housing to the fastener and to assure that substantial subsequent manipulation of the fastener for removal of the fastener causes a visually apparent change in the tamper-evident appearance of the sleeve. The method of installing a tamper-evident fastener of this invention further comprises the steps of inserting at least a portion of the fastener head into the central cavity of the elastomeric housing of the sleeve, inserting the elongated fastener shaft into the passage formed in the object, and applying heat to the thermoshrinkable sleeve sufficient to shrink the thermoshrinkable sleeve to substantially conform with the at least a second portion of the fastener head.

A portion of the elongated shaft provided in a method according to the present invention may be threaded for mating with a threaded portion of the passage. Additionally, the fastener may be configured to prevent a fluid from migrating through the passage.

A method of installing a tamper-evident fastener according to the present invention may further comprise the step of heating at least a portion of the elastomeric housing to shrink at least a portion of the elastomeric housing to substantially conform to at least a third portion of the fastener head. This provides an intermediate layer between the fastener head and a surface adjacent the distal surface of the fastener head and surrounding the passage when the fastener shaft is inserted into the passage of the object.

An elastomeric housing provided in a method of installing a tamper-evident fastener according to the present invention may be formed and configured so that the elastomeric housing after thermal shrinking remains secured to the fastener upon subsequent exposure to temperatures up to at least about 250° F. The elastomeric housing may be formed and configured so that the elastomeric housing after thermal shrinkage will remain secured to the fastener upon subsequent contact with a petroleum product.

Another method for installing a tamper-evident sheath on a fastener having a head attached to a shaft wherein the fastener is installed into a passage formed in an object according to the present method comprises the steps of removing the fastener shaft from the passage in the object, cleaning the fastener and providing a sleeve for disposing around at least a first portion of the fastener head. The sleeve has an the elastomeric housing defining a central cavity and at least one opening into the central cavity with the elastomeric housing of the sleeve being formed from a thermoshrinkable material and configured so that upon disposition around the at least a first portion of the fastener head and application of sufficient heat the elastomeric sleeve shrinks to establish a tamper-evident appearance and conform to at least a second portion of the fastener head. This secures the elastomeric housing to the fastener and assures that substantial subsequent manipulation of the fastener for removal of the fastener causes a visually apparent change in the tamper-evident appearance of the sleeve. The method further comprises inserting at least a first portion of the fastener head into the central cavity of the elastomeric housing of the sleeve, inserting the elongated fastener shaft into the passage formed in the object, and applying heat to the thermoshrinkable sleeve sufficient to shrink the thermoshrinkable sleeve to substantially conform with the at least a second portion of the fastener head.

The fastener of the method of installing a tamper-evident sheath on a fastener installed into a passage may be an oil drain plug. When the fastener is an oil drain plug the step of cleaning the fastener includes removing residual petroleum products.

The method of installing a tamper-evident sheath on a fastener installed into a passage may include the step of inspecting a previously installed tamper-evident sheath formed on the head of the fastener. The method may further include the step of removing the previously installed tamper-evident sheath formed on the head of the fastener.

DETAILED DESCRIPTION OF THE INVENTION

The present invention is a fastener and thermoshrinkable sleeve assembly. More particularly, it is a fastener and thermoshrinkable sleeve wherein when the thermoshrinkable sleeve is heated the thermoshrinkable sleeve shrinks to substantially conform to the configuration of the fastener head thereby providing a protective sheath that must be dislodged or removed to alter the position of the fastener. This sheath serves to verify proper installation or identify tampering. In one preferred embodiment, the fastener is a threaded fastener. In another preferred embodiment, the thermoshrinkable sleeve may additionally function as a washer between the threaded fastener and the object that receives the threaded fastener.

The term "fastener" is taken in this instance to mean any shafted fastening or plug device for holding an object in position, for holding two or more objects in a fixed relative position or for preventing fluid flow through an orifice. This includes but is not limited to screws, bolts, rivets, threaded plugs and the like.

In a preferred embodiment of the present invention, the fastener is a threaded machine screw used as a motor oil drain plug.

Figure 1:
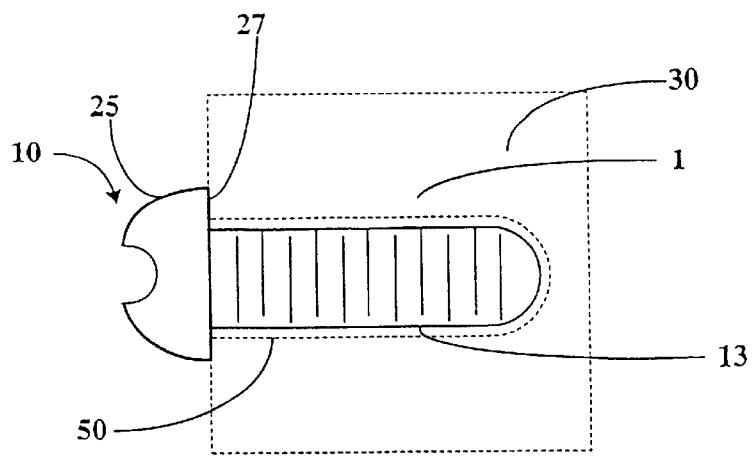
FIG. 1 is a side view of a tamper-evident fastener according to the present invention.

FIG. 1 illustrates a tamper-evident fastener 10 of the invention as it appears installed and in use in an object 30. As FIG. 1 shows a thermoshrinkable sleeve that has been shrunk to form a sheath 25 substantially conforming to the head of a shafted fastener 1. Additionally, a formed portion 27 of the sheath 25 adjacent to the distal surface of the fastener head serves as a washer when the fastener 1 is positioned securely in the object 30. As will be appreciated by one skilled in the art the threading on the shaft 13 is illustrative and the invention is equally applicable to non-threaded fasteners with other types of shafts and to threaded fasteners with different threading configurations.

Figure 2:
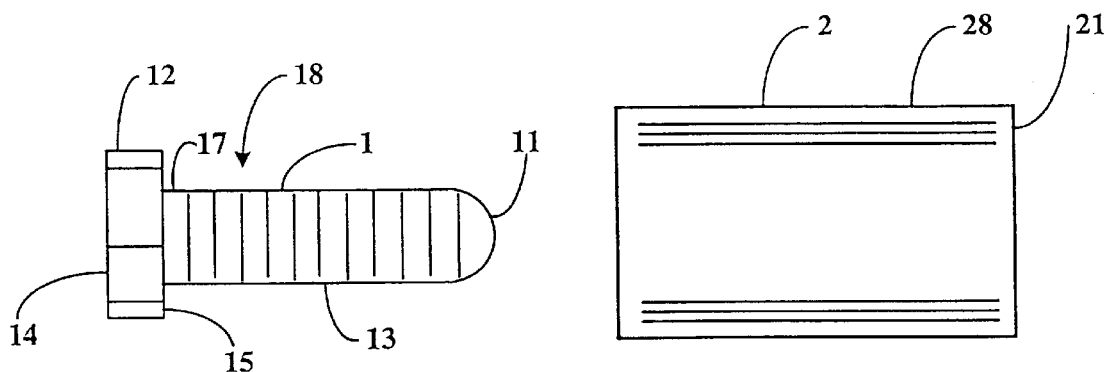
FIG. 2 is a side view of the unassembled components of a tamper-evident fastener according to a preferred embodiment of the present invention.

Turning to FIG. 2, a tamper-evident fastener 10 according to the present invention includes a machine screw 18 having a threaded shaft 13 with a proximal end 17 and a distal end 11 and a hexagonal head 12. The head 12 is configured for manipulation by standard tools and in particular for manipulation by an appropriately sized socket and socket wrench. As shown in FIG. 2, the head 12 has a proximal surface 14 and a substantially parallel distal surface 15. It will be understood by those having ordinary skill in the art that other fasteners having a shaft and a head may also be used without departing from the scope of the invention. This includes in particular, screws and bolts with heads having slots or shaped apertures for manipulation using screwdrivers or allen wrenches or the like.

Figure 3:
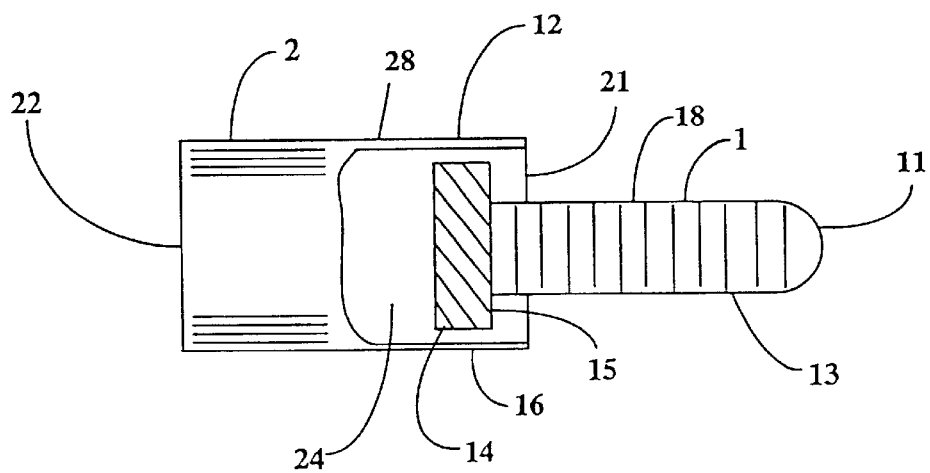
FIG. 3 is a cross-sectional view of a partially assembled tamper-evident fastener according to a preferred embodiment of the present invention.

The sleeve 2 is formed with a cylindrical sleeve wall 28 defining a cylindrical central cavity 24 having a diameter sufficient to allow insertion of the head 12 of the machine screw 18 as illustrated in FIG. 3. The central cavity 24 is preferably sized to accommodate a socket that would be used to manipulate the head 12 for installation of the machine screw 18 . This allows the installation of the machine screw 18 after insertion of the head 12 into the sleeve 2.

The sleeve 2 is formed of a thermoshrinkable material so that upon application of heat sufficient to raise the temperature of the sleeve 2 to a predetermined level, the sleeve wall 28 collapses to conform to the contour of the head 12 positioned within the central cavity 24. Upon cooling, the collapsed wall 28 retains its new configuration, thus forming a sheath 25 around a portion of the head 12 of the machine screw 18, as illustrated in FIG. 1. The close conformity of the sheath 25 with the head 12 prevents the insertion of tools into the central cavity 24 to manipulate the head 12 for removal of the machine screw 18. Thus, if the sheath 25 is formed after the machine screw 18 has been tightened in place, the machine screw 18 cannot be removed without either removing the sheath 25 or using a tool on the outside of the surface of the sheath 25. The thermoshrinkable material used to form the sleeve 2 is an elastomeric material that is relatively easily marred or deformed. In particular, the material is selected so that after shrinkage, application of the tools and force necessary to manipulate the machine screw 18 will cause a readily apparent deformation and possible loss of structural integrity of the sheath 25. Thus, the installed fastener 1 cannot be removed without removal or disfigurement of the sheath. This allows ready determination of whether the machine screw 18 has been removed or tampered with subsequent to formation of the sheath 25.

Figure 4:
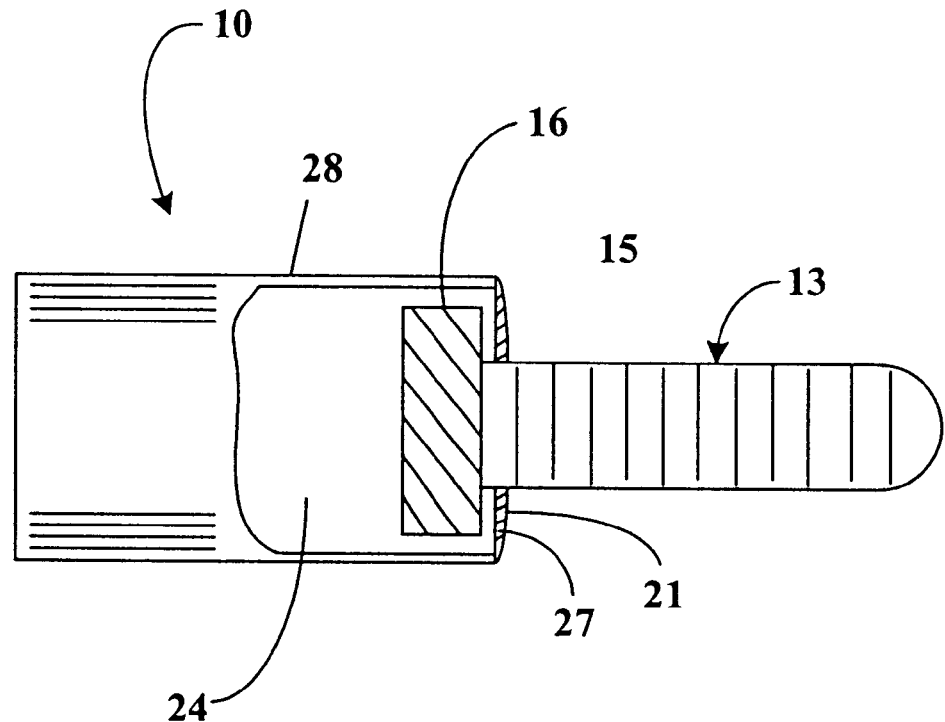
FIG. 4 is a cross-sectional view of partially assembled tamper-evident fastener according to a preferred embodiment of the present invention.

The tamper-evident fastener 10 may be provided as an assembly as shown in FIG. 3 and 4 or a separately provided fastener and sleeve components. In a preferred embodiment, thermoshrinkable sleeve 2 is positioned such that the sleeve 2 extends to cover at least a portion of the head 12 of the fastener 1, and the distal end 21 of the sleeve 2 extends beyond the distal surface 15 of the head 12 but terminates in a position such that a substantial portion of the shaft 13 of the fastener 1 is exposed and such that the proximal end 22 of the thermoshrinkable sleeve extends at least onto the sides 16 of the fastener head 12 and preferably beyond the proximal surface 14 of the fastener head 12.

Extension of the sleeve 2 beyond the distal surface 15 of the fastener head 12 allows the user of the fastener 1 to form a washer-like bearing surface adjacent the distal surface 15 of the head 12. The distal end 21 of the thermoshrinkable sleeve 2 is positioned to extend beyond the fastener head 12 towards the fastener shaft 13 approximately the same as the distance between the outer edge 16 of the fastener head 12 and the fastener shaft 13. Heat is applied to the distal end 21 of the thermoshrinkable sleeve 2 to cause the material at the distal end 21 of the sleeve 2 to shrink to substantially conform to the distal surface 15 of the fastener head 12, thus creating a washer-like bearing portion 27, as shown in FIG. 4.

Importantly, the bearing portion 27 conforms to the distal surface without adhesion to the head 12 and allows sufficient spacing between the bearing portion 27 and the fastener head 12 for tightening the fastener into position in an object without deforming the sleeve 2 or bearing portion 27. The bearing portion 27 provides a layer of material formed along the distal surface 15 of the fastener head 12 capable of serving as a washer for the fastener 1.

Figure 5:
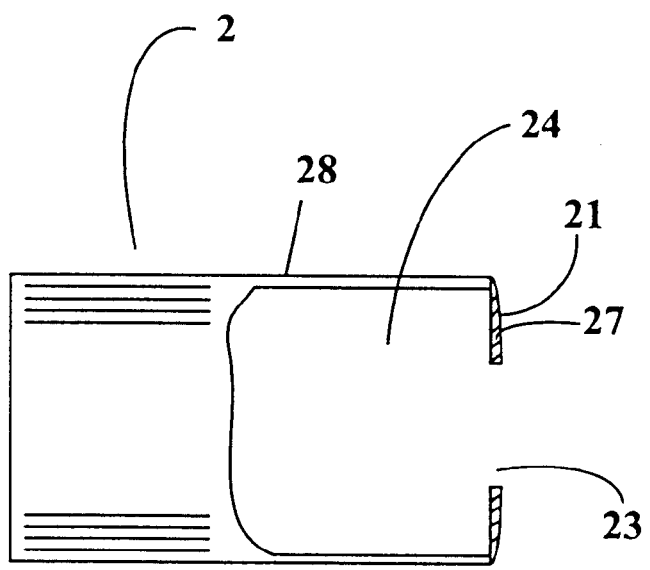
FIG. 5 is a cross-sectional view of an alternative embodiment of the sleeve of the invention.

In an alternative embodiment as shown in FIG. 5, the thermoshrinkable sleeve 2 has a pre-formed distal end 21 that substantially conforms to the shape of the side 16 and distal surface 15 of the fastener head 12 and contains an opening 23 in the preformed distal end 21 of the thermoshrinkable sleeve 2 sufficient to allow passage of the fastener shaft 13. The central cavity 24 of the sleeve 2 is shaped so that when a fastener 1 is positioned in the sleeve 2 with the fastener shaft 13 projecting from the opening 23 the preformed distal end 21 of the sleeve 2 provides a washer-like bearing surface 27 for the screw head 12. As one skilled in the art will recognize, the shape of the preformed thermoshrinkable sleeve 2 has many possible configurations depending on the type and shape of fastener 1 used.

The cylindrical sleeve is one embodiment of the structure used to form the tamper-evident sheath. The structure may take many other forms and may have a cap like appearance. The basic requirement for the structure is that it include an elastomeric housing defining a central cavity and at least one opening wherein the central cavity and opening are configured to accommodate at least partial insertion of a fastener head into the central cavity. The sleeve configuration is particularly adaptable because of its use of two openings, but it will be understood that a cap like housing with only a single opening into its central cavity may also be used.

In general the material for the sleeve is preferably a thermoshrinkable material with flexibility. Additionally, the sleeve material should have a tolerance to thermal degradation compatible with the environment in which the device is intended to be used. For example, for an embodiment of the device used in oil drains of motors, a material that after thermoshrinking can withstand subsequent exposure to temperatures up to 250° F. or more is preferable. In some embodiments of the device, a material with oil and/or chemical resistance is preferable. For example, resistance to petroleum products is preferable when the device is used in the oil drain of a motor vehicle. As one skilled in the art will recognize petroleum products include but are not limited to motor oils, lubricating oils, gasoline, diesel fuel, kerosene, hydrocarbon distillates derived from crude oil and the like. Oil and/or chemical resistance is important generally in many applications to prolong the life and integrity of the sheath and is particularly important in those embodiments where a portion of the sleeve is to function as a washer subject to chemical and/or oil exposure. An example of a suitable material for use with motor oil drain plugs is that used in thermoshrinkable sleeve model 3600 supplied by Plano Molding Company, Plano, Ill. The material of the sleeve walls can have a thickness of about 0.005 to 0.1 inches and preferably has a thickness of about 0.01 to 0.02 inches.

The present invention also includes a method of using or installing the screw-thermoshrinkable sleeve assembly 10. The methods includes providing a screw 18 having an elongated shaft 13 and a screw head 12 and a sleeve 2 with a housing defining a central cavity 24 and at least one opening 23 into the central cavity 24 that can be placed around at least a portion of the screw head 12 and formed from a thermoshrinkable material that will shrink with the application of heat to cause the sleeve 2 to shrink to establish a tamper-evident appearance and conform to at least a portion of the screw head 12. The nature of the sleeve 2 should be such that substantial subsequent manipulation of the screw 18 for removal of the screw 18 causes a visually apparent change in the tamper-evident appearance of the sleeve 2.

The screw head 12 is inserted into at least a portion of the central cavity 24 of the sleeve 2 and the screw shaft 13 is inserted into the passage 50 in an object 30. Once the screw 18 is positioned which may include tightening the screw 18 to an optimum tightness, heat is applied to the sleeve 2 sufficient to shrink the sleeve 2 to substantially conform to the screw head 12.

In preferred embodiments the method includes use of a threaded fastener 1 wherein the fastener shaft 13 and the surface of the passage in the object accepting the shaft 13 are threaded. In other embodiments a non-threaded fastener may be used and secured appropriately.

A preferred embodiment of the method includes use of a cylindrical sleeve 2. In other embodiments of the method the sleeve 2 may be provided preformed as a cylinder with a preformed end or as a cap like structure, for example. As one skilled in the art will recognized, many shapes for the performed sleeve 2 are possible so long as the preformed sleeve 2 is comprised of an elastomeric housing defining a central cavity 24 and at least one opening 23 into the central cavity 24 wherein the central cavity 24 and opening 23, are configured to accommodate at least partial insertion of a fastener head.

The method may include the further step of heating a portion of the sleeve 2 to shrink the sleeve 2 to conform to the distal surface 15 of the fastener head. A heat gun may be used, for example, to supply heat sufficient to shrink the thermoshrinkable material. This step is desirable when a cylindrical sleeve 2 is used.

In an embodiment of the invention directed to use of the device in motor oil drains, the fastener 1 may be recycled with the thermoshrinkable sleeve 2 being replaced each time the oil is changed. In cases where the fastener 1 is recycled, removing existing tamper-evident sheaths 25 and/or washers and cleaning residual oil or other residue from the fastener before placing the fastener 1 into the thermoshrinkable sleeve 2 and positioning it in the oil drain may be preferable. Inspection for evidence of tampering may be a routine step of the process of changing oil and reinstalling the tamper-evident fastener or may be done on an as needed basis. The oil drain plug is one example of a situation where recycling the fastener and replacing the sheath is desirable. As one skilled in the art will recognize recycling the fastener may be desirable in many applications.

The appearance of the device after installation including the step of thermal shrinking of the proximal end 22 of the thermoshrinkable sleeve 2 is shown in FIG. 1. Thermal shrinking the proximal end 22 of the thermoshrinkable sleeve 2 creates a sheath around the head 12 of the fastener 1. The presence of the sheath allows for visual inspection to determine that the fastener 1 has been inserted properly and tightened appropriately. Additionally, the sheath of the thermoshrunken sleeve 2 is readily damaged by any known method employed to dislodge the screw. Thus, tampering can be detected by visual inspection. Removal of the thermoshrunken sleeve 2 can be accomplished readily by cutting the sleeve 2 or twisting the fastener 1. Thus, the thermalshrunken sleeve 2 does not impede normal use of the fastener, but removal of the fastener 1 renders the thermoshrunken sleeve 2 in a condition readily distinguishable from its appearance prior to removal. The deformation created in the thermoshrunken sheath 25 when the thermoshrunken sheath 25 is removed or manipulated is not readily reversible.

The thermoshrinkable sleeves 2 of the device may be marked with identifying graphics, colors, trace chemical markers and the like. These markings may be used to link a given thermoshrinkable sleeve with specific information. Examples of the type information that may be conveyed by the marking include, but are not limited to, imprinting with company trademarks, company logos, identifying words or numbers, codes traceable to individuals installing devices, time of installation and the like, or including coding features such as various colors or chemical markers in the composition of the sleeve and the like which provide more sophisticated means of relating a given sleeve to its origin.

It will therefore be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its preferred embodiment, it is to be understood that this disclosure is only illustrative and exemplary of the present invention and is made merely for the purposes of providing full and enabling disclosure of the invention. The foregoing disclosure is not intended to be construed or to limit the present invention or otherwise to exclude any other such embodiments, adaptations, variations, modifications and equivalent arrangements, the present invention being limited by the claims and the equivalents thereof.

What is claimed is:

1. A tamper-evident fastener for insertion in to a passage formed in an object, comprising:
    a fastener, said fastener having:
        an elongated fastener shaft having a proximal end and a distal end, and
        a fastener head attached to said proximal end of said fastener shaft, and configured for manipulating said fastener for installation and removal; and
    an elastomeric sleeve which extends over said fastener head and is made of a thermoshrinkable material, said elastomeric sleeve defining a central cavity and having:
        a first end, said first end having an opening configured to accommodate at least partial insertion of said fastener head into said central cavity, and
        a second end, said second end having a bearing member of a diameter which is smaller than said fastener head but larger than said fastener shaft attached thereto,
    said elastomeric sleeve being shrinkable upon application of heat after installation to conform to at least a portion of said fastener head, and be securely attached to said fastener so that a substantial subsequent manipulation of fastener changes an appearance of said elastomeric sleeve, whereby a tamper evidence on said elastomeric sleeve is formed and can be easily visualized.

2. A tamper-evident fastener according to claim 1, wherein said elastomeric sleeve has a shape of a cylindrical tube.

3. A tamper-evident fastener according to claim 1, wherein said bearing member provides a liquid-proof tight seal between said fastener head and a surface surrounding the passage when said fastener shaft is inserted into the passage and tightened.

4. A tamper-evident fastener according to claim 1, wherein said elastomeric sleeve after thermal shrinkage remains intact upon subsequent exposure to temperatures up to at least about 250° F.

5. A tamper-evident fastener according to claim 1, wherein said elastomeric sleeve after thermal shrinkage remains intact upon subsequent contact with a petroleum product.

6. A method of installing a tamper-evident fastener into a passage formed in an object, comprising the steps of:
   (a) providing a fastener, said fastener having
      an elongated fastener shaft with a proximal end and a distal end, and
      a fastener head attached to the proximal end of said fastener shaft, said fastener head having opposed distal and proximal surfaces and being configured for manipulating said fastener for installation and removal;
   (b) providing an elastomeric sleeve which extends over said fastener head and is made of a thermoshrinkable material, said elastomeric sleeve defining a central cavity and having
      a first end, said first end having an opening configured to accommodate at least partial insertion of said fastener head into said central cavity, and
      a second end, said second end having a bearing member of a diameter which is smaller than said fastener head but larger than said fastener shaft attached thereto;
   (c) inserting at least a portion of said fastener head into said central cavity;
   (d) inserting said elongated fastener shaft into the passage formed in the object;
   (e) tightening said fastener against the object so that said bearing member of said elastomeric sleeve forms a liquid-proof tight seal; and
   (f) applying sufficient heat to shrink said elastomeric sleeve and to substantially conform said elastomeric sleeve to at least a portion of said fastener head so that a subsequent manipulation of said fastener changes an appearance of said elastomeric sleeve, whereby a tamper evidence on said elastomeric sleeve is formed and can be visualized.

7. The method according to claim 6, wherein the elastomeric housing is formed and configured so that the elastomeric housing after thermal shrinkage will remain secured to the fastener upon subsequent exposure to temperatures up to at least about 250° F.

8. The method according to claim 6, wherein the elastomeric housing is formed and configured so that the elastomeric housing after thermal shrinkage will remain secured to the fastener upon subsequent contact with a petroleum product.

9. A method of installing a tamper-evident sheath on a fastener installed in an object, the fastener having a head attached to a shaft, the shaft being at least partially disposed within a passage formed in the object, the method comprising the steps of:

removing the fastener shaft from the passage in the object;
   cleaning the fastener;
   providing a sleeve for disposing around at least a first portion of the fastener head, the sleeve having an elastomeric housing defining a central cavity and at least one opening into the central cavity, the elastomeric housing being formed from a thermoshrinkable material and configured so that upon disposition around the at least a first portion of the fastener head and application of sufficient heat, the elastomeric sleeve will shrink to establish a tamper-evident appearance and conform to at least a second portion of the fastener head to secure the elastomeric housing to the fastener and to assure that substantial subsequent manipulation of the fastener for removal of the fastener causes a visually apparent change in the tamper-evident appearance of the sleeve;
   inserting the at least a first portion of the fastener head into the central cavity of the elastomeric housing of the sleeve;
   inserting the elongated fastener shaft into the passage formed in the object; and
   applying heat to the thermoshrinkable sleeve sufficient to shrink the thermoshrinkable sleeve to substantially conform with the at least a second portion of the fastener head.

10. The method according to claim 9, wherein the fastener is an oil drain plug and the step of cleaning the fastener includes removing residual petroleum products.

11. The method according to claim 9 further including the step of inspecting a previously installed tamper-evident sheath formed on the head of the fastener.

12. The method according to claim 11, further including the step of removing the previously installed tamper-evident sheath formed on the head of the fastener.

* * * * *